United States Patent [19]

Lo

[11] Patent Number: 4,962,139
[45] Date of Patent: Oct. 9, 1990

[54] CONDUCTIVE PRIMER COMPOSITIONS WITH PRIMARY RESIN BINDER

[75] Inventor: Salvador R. Lo, Blue Island, Ill.

[73] Assignee: W. C. Richards Company, Blue Island, Ill.

[21] Appl. No.: 150,375

[22] Filed: Jan. 29, 1988

Related U.S. Application Data

[60] Continuation-in-part of Ser. No. 61,084, Jun. 12, 1987, abandoned, which is a division of Ser. No. 922,318, Oct. 23, 1986, Pat. No. 4,715,012, which is a continuation-in-part of Ser. No. 829,112, Feb. 28, 1986, abandoned.

[51] Int. Cl.⁵ .......................... C08L 63/00; H01B 1/04
[52] U.S. Cl. ..................................... 523/468; 252/506; 252/507; 252/510; 252/511; 524/902
[58] Field of Search ............... 252/511, 507, 506, 510; 523/468; 524/902

[56] References Cited

U.S. PATENT DOCUMENTS

| | | | |
|---|---|---|---|
| 3,705,817 | 7/1970 | Durr | 117/93.31 |
| 4,228,050 | 10/1980 | Martin et al. | 252/511 |
| 4,399,768 | 8/1983 | Tokushima et al. | 118/50.1 |
| 4,402,765 | 9/1983 | Goto et al. | 148/6.15 R |
| 4,416,807 | 11/1983 | Datta et al. | 252/511 |
| 4,451,597 | 4/1984 | Victorius | 427/385.5 |
| 4,469,531 | 9/1984 | Tokushima et al. | 148/6.15 R |
| 4,489,135 | 12/1984 | Drexler et al. | 427/385.5 |
| 4,521,489 | 6/1985 | Rehfuss et al. | 427/388.2 |
| 4,524,192 | 6/1985 | Alexander et al. | 427/388.2 |
| 4,532,074 | 7/1985 | Labib et al. | 252/511 |
| 4,551,491 | 11/1985 | Panush | 428/388.2 |
| 4,592,961 | 6/1986 | Ehrreich | 252/511 X |
| 4,698,391 | 10/1987 | Yacobucci et al. | 252/511 X |

Primary Examiner—Thurman K. Page

[57] ABSTRACT

The present invention is directed to improved conductive primer compositions and methods. In the improved methods aspect of the present invention, a non-conductive polymeric component is precoated with a primer to render it electroconductive in preparation for electrocoating. Next, the primed polymeric comonent is assembled with a conductive metallic component to form a multi-material workpiece. Finally, the formed workpiece is submerged in an electrocoat bath for simultaneously electrocoating both the primed polymeric component and the conductive metallic component. In some preferred embodiments, the workpiece may be an automobile body. In the improved electroconductive primer compositions aspect of the present invention, such compositions comprise a dispersion of approximately 70% to 90% of a polymeric resinous which will cure to form a film, approximately 10% to 30% of a conductive carbon pigment, in some embodiments approximately 0.25 to 0.45 of an electron transmitting or other surfactant or dispersing agent, and a sufficient volume of solvents to provide a flowable viscosity to the primer. Such primer may be formed from a wide variety of different resins.

7 Claims, 3 Drawing Sheets

CONDUCTIVE PRIMER COMPOSITIONS WITH PRIMARY RESIN BINDER

BACKGROUND OF THE INVENTION

This application is a continuation-in-part of application Ser. No. 061,084, filed on June 12, 1987 which was a divisional of application Ser. No. 922, 318, filed on Oct. 23, 1986, which is a continuation-in-part of application Ser. No. 829,112, filed on Feb. 28, 1986, and now abandoned.

The present invention is directed to the electrocoating arts, and more particularly to an improved method of simultaneously electrocoating a multi-material workpiece formed from a non-conductive component, and also from a conductive component, by electrocoat bath deposition or by spraying. Such multi-material workpiece may preferably comprise an automobile body, or other automotive components.

In the prior art, and especially in the automobile manufacturing art, certain problems have appeared in production of automobile body and components. Specifically, for reasons of cost and to impart desirable properties to various automobile components, polymeric or plastic components have been used and are now being used for parts which in the past have been formed from metal. The result is that the automobile body may have, for example, polymeric front and rear bumper components, polymeric interior trim, polymeric steering column components, and other automobile components formed from polymeric or plastics materials. Indeed, such components may be formed from different types of polymers to impart different physical characteristics to different parts.

Automobile manufacturers have deemed it beneficial to attempt to provide the same general appearance to the polymeric components as that of the metallic components. One difficulty in providing such uniform appearance is that the metallic components may be readily electrocoated, as they are conductive, but the polymeric components in the past could not be electrocoated, as they were not electroconductive. The result was that the polymeric components had to be coated separately, by other techniques, and by different coating compositions, and at different times, from the metallic components. The result in many instances was less than satisfactory in the prior art as the polymeric components did not "mesh" in physical appearance with the metallic components. A further problem was that additional equipment and facilities had to be provided for at least two separate coating operations—one operation for electroconductive materials and at least one other for the non-electroconductive materials.

One object of the improved methods and compositions of the present invention is to materially alleviate the difficulties associated with prior art techniques, and more particularly to lower the costs associated therewith, increase the efficiency of the respective operations, to provide an improved final product, and to provide primer coating compositions having a wide applicability as conductive coatings and/or substrates.

BRIEF SUMMARY OF THE INVENTION

The improved methods of the present invention are directed to simultaneously electrocoating a multi-material workpiece having a conductive, metallic component and at least one non-conductive, polymeric component. The steps comprise first precoating the non-conductive, polymeric component with an electroconductive primer; curing such primer; assembling the primed polymeric component with the conductive, metallic component to form a multi-material material workpiece; and submerging the formed workpiece in an electrocoat bath for simultaneously electrocoating both the primed polymeric component and the conductive, metallic component. In alternative embodiments, the multi-material workpiece may be sprayed with electrostatic spray equipment.

The non-conductive, polymeric component may comprise, for example, virtually any automobile body component where the structural properties of the polymeric material permit. The pre-coating of the primer may be by either dipping techniques, spraying techniques, in-mold coating techniques, or other techniques known to those of ordinary skill in the art.

The improved electroconductive coating composition of the present invention may in some preferred embodiments comprise a dispersion of approximately 70% to 90% of a curable film-forming polymeric resin binder, approximately 10% to 30% of a conductive carbon pigment, in some embodiments approximately 0.2 to 0.45 of an electron transmitting or other surfactant or dispersing agent, and sufficient solvents to provide a flowable viscosity to the primer. Such solvents include in some embodiments organic solvents, and water as a solvent in other such preferred embodiments.

When certain resin binders are utilized, an acid catalyst system is necessary for proper cure of the film, and in those embodiments approximately 1% to approximately 3% of an acid, preferably a sulfonic acid, is utilized. Preferred alternative embodiments may incorporate approximately 18% to 30% of a finely ground metal into such conductive coating compositions, and with corresponding reduction in the amount of resin binder necessary in some preferred embodiments.

The methods and compositions of the present invention will be better understood with respect to the following brief description of the drawing, detailed description of preferred embodiments, appended claims, and accompanying drawing.

DETAILED DESCRIPTION OF PREFERRED EMBODIMENTS

The first aspect of the present invention is directed to improved methods of simultaneously electrocoating a multi-material workpiece having a conductive, metallic component and at least one non-conductive, polymeric component. Preferred embodiments of these methods of the present invention comprise the steps of pre-coating the non-conductive polymeric component with a primer which is conductive when cured into a film, thereby to render the surface of the polymeric component sufficiently conductive for electrocoating. Next, the primed polymeric component is assembled with the conductive, metallic component to form the multi-material workpiece. Finally, the formed workpiece in some preferred embodiments is submerged into an electrocoat bath for simultaneously electrocoating both the primed polymeric component and the conductive, metallic component of the formed multi-material workpiece. In alternative preferred embodiments, the multi-material workpiece is electrostatically coated by oppositely charging the workpiece and the coating droplets by techniques well-known to those skilled in the electrostatic coating arts.

In some preferred embodiments, the multi-material workpiece may be an automobile chassis, although both the method and composition aspects of the present invention have application in wide areas outside the automotive arts. In automotive embodiments, the non-conductive, polymeric component may comprise bumper components, automobile interior trim work, portions of the automobile steering column, portions of the automobile body, etc. In such preferred embodiments, the primer precoating is preferably cured at 300° F. for approximately 15 minutes prior to assembly with the conductive metallic component of the multi-material workpiece. The primer coating compositions of the present invention, described in greater detail, infra, may be applied to the work piece 30 days or more in advance and shipped elsewhere or stored for later coating without substantial reduction in efficiency.

As to methods of pre-coating of the non-conductive polymeric primer component, such polymeric components may be dipped into a bath of the conductive primer, or may be sprayed with the conductive primer utilizing techniques known to those having ordinary skill in the art. In-mold coating techniques may also be used.

Figure 1:
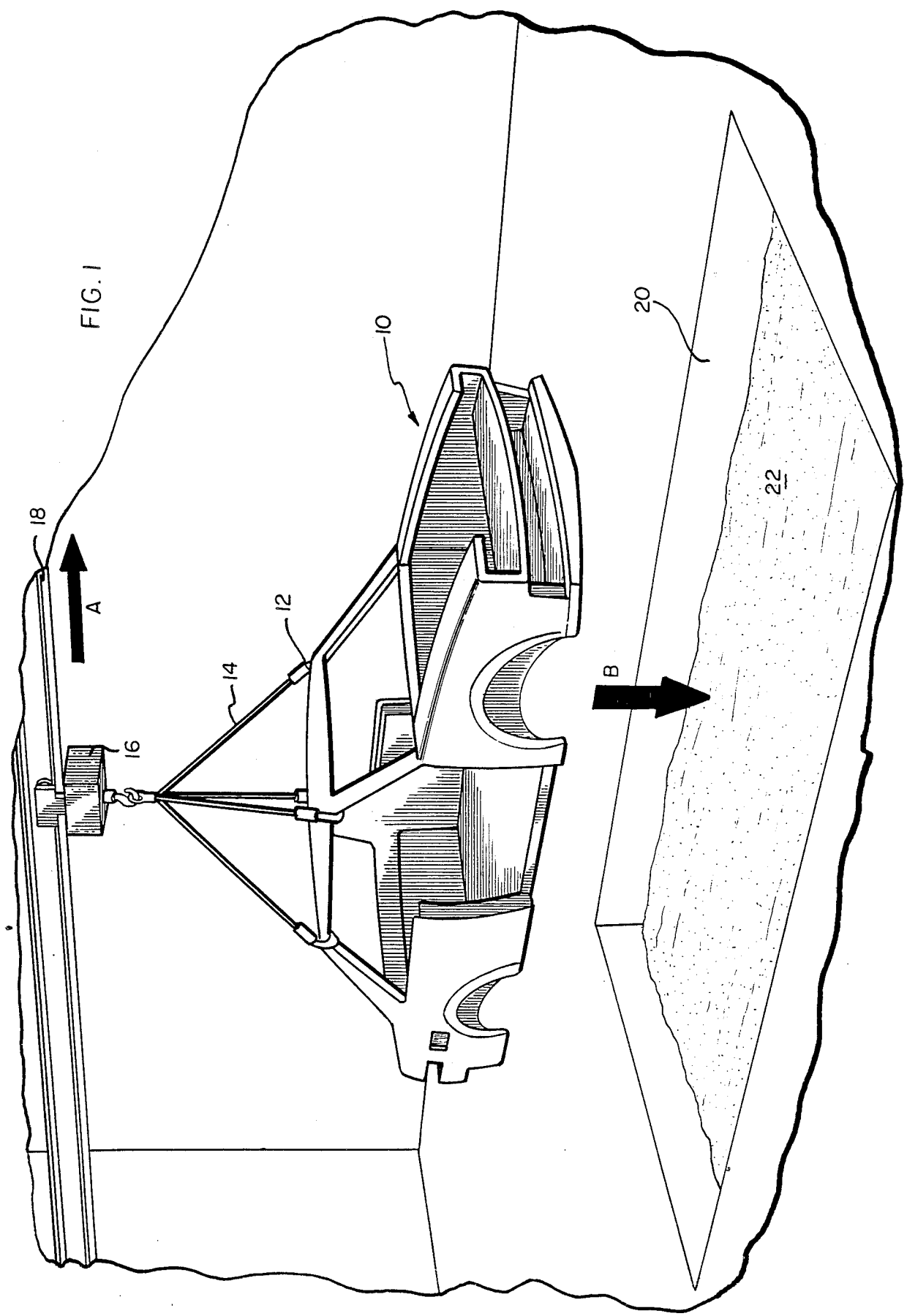
FIG. 1 is a perspective schematic view of the improved method of simultaneously electrocoating a multi-material workpiece of the present invention, and particularly showing an automobile body suspended above an electrocoat bath, with the automobile body containing both conductive, metallic components and at least one non-conductive, polymeric component which has previously been coated with an electroconductive primer prior to assembly together with the conductive, metallic component to form the multi-material workpiece.

Referring now to the drawing and to FIG. 1 in particular, an illustrative example of one of the method aspects of the present invention is shown schematically. In particular, a preferred embodiment of the improved methods of simultaneously electrocoating a multi-material workpiece having a conductive, metallic component and at least one non-conductive, polymeric component is shown.

An automobile chassis generally 10 is shown suspended by hooks 12 and cables 14 from an overhead crane 16 movable in the direction as shown by arrow A along track 18. Such chassis 10 may be lowered as shown by Arrow B into electrocoat bath 20 containing an electrocoating material 22 of the type and utilizing electrocoat techniques known to those skilled in the electrocoat arts. One or more components of the automobile chassis 10 may be formed of a non-conductive, polymeric material to be pre-coated with the conductive primer compositions of another aspect of the present invention. Such parts are then assembled with the conductive, metallic components for simultaneous electrocoating in bath 20. Such parts may comprise, for example: (a) the rear bumper, bumper facia, and/or back-up beams; (b) the front bumper, bumper facia, and/or back-up beams; (c) the spoiler(s); (d) the air ram; (e) the grill parts; (f) the fender(s); (g) the door panel(s); (h) the quarter panel(s); (i) the hood; (j) the interior trim; and/or (k) the steering column components. Such non-conductive polymeric parts, some of which are shown schematically in FIG. 1, are depicted for purposes of illustration, and no limitation as to the type of such parts is intended, whether in the automotive industry or in other industries.

In regard to the second aspect of the present invention involving improved electroconductive coating compositions, such compositions may be utilized as a coating or primer for a non-conductive substrate material, for example polymeric components, and more particularly polymeric components of an automobile. Other non-conductive substrate materials may also be used. Such non-conductive substrate materials are prepared for electrocoating by rendering them electroconductive, which is accomplished by coating their surfaces with the electroconductive primer coating compositions of the present invention. Such improved electroconductive primer coating compositions comprise in some preferred embodiments a dispersion of approximately 70% to 90% of a curable, film-forming polymeric resin binder, which upon cure thereof will form a stable film to adhere to the surface of the substrate; approximately 10% to 30% of a conductive carbon pigment; in some embodiments approximately 0.2% to 0.45% of an electron transmitting or other surfactant; and sufficient solvents to provide a flowable viscosity to the primer. Such electron transmitting surfactant(s) provide in the cured film conductive pathways for electrons between the conductive carbon pigment In other embodiments of the present invention where surfactants of the wetting agent variety are utilized, such surfactants (or dispersing agents) function to assist in and to assure complete dispersion of at least the carbon black pigment ingredient to provide the requisite conductivity in the cured film. In some other alternative embodiments, the surfactant(s) are entirely eliminated; however, more time must be spent in the grinding process to assure the necessary complete dispersion of the carbon black pigment.

In embodiments of the present invention requiring acid catalysis for proper cure, 1% to 3% of an acid is incorporated within the composition. Such acid catalyst may be selected from the group consisting of an organic acid, aromatic sulfonic acid, p-toluene sulfonic acid, phosporic acid, alkyl phosphoric acid, maleic acid, trimellitic acid, phthalic acid, and acrylic acid. In preferred embodiments, such acid catalyst comprises dinonylnaphthalene disulfonic acid or dinonylnaphthalene (mono)sulfonic acid.

In alternative embodiments, either organic solvent systems or aqueous solvent systems may be utilized.

The polymeric resin binder in preferred embodiments may comprise a primary resin, and a cross-linking resin. The primary resin may be selected from the group consisting in preferred embodiments of polyester, epoxy, epoxyester, and epoxy urea resins. In alternative embodiments, and depending in part upon the substrate to be primed, and the selected characteristics of film properties and film curing environment, such primary resin may be selected from the group consisting of alkyd, alkyd urea, acrylic, silicone copolymers, ketone resins, cellulose acetate, cellulose acetate butyrate, nitrocellulose, hydrolyzed polyvinyl acetate, polyvinyl butyral, hydroxyethyl cellulose, polyacrylamide, methyl cellulose, and polyvinyl alcohol resins.

The cross-linking resin which may be used in conjunction with such primary resin preferably comprises a melamine resin; and more particularly, melamine-formaldehyde resins have been found to provide optimum utility. One such melamine-formaldehyde resin which has functioned exceptionally well is hexamethoxymethylmelamine resin.

In alternative embodiments of the improved primer compositions of the present invention, the polymeric resin binder is water soluble and may be selected from the group consisting of butadiene latex, acrylic acetate emulsion, polyvinyl acetate emulsion, and alkyd resin emulsion.

In preferred embodiments of the improved electroconductive primer compositions of the present invention, such compositions preferably have a viscosity of approximately 7 to 8 seconds using a No. 3 Zahn cup. The conductive carbon pigment in such preferred embodiments is ground to approximately 6.5 to 7.5 on the Hegman grind gauge. Some conductivity has been found at 4.5 to 5.5 grind; however, conductivity was found to fall in the 5.5 to 6.5 grind range. The gloss of such preferred compositions in the cured film is approximately 0 to 30 on a 60° gloss meter.

In preferred embodiments, the curable film-forming polymeric resin binder, the conductive carbon pigment and in some embodiments a metallic pigment, the electron transmitting surfactant, and a portion of the solvent are mixed to form a paste for grinding. Such grinding may be accomplished by a steel ball mill, a sand mill, a pebble mill, or other techniques known to those of ordinary skill in the art. When such grind is accomplished, it has been found that the cured primer film has resistance measured over a 2 inch spread on the film surface of at most approximately 2.3 Megohms.

Preferred solvents for organic soluble resins comprise 1,1,1 trichloroethane, which is also known as methyl chloroform. Additional solvents may include light aromatic solvent naphtha. Other compatible solvents may be selected depending upon the resin(s) utilized, and according to the knowledge of those skilled in the art, and as set forth in the alternative preferred embodiments as set forth in the Examples, infra.

The electron transmitting surfactant used in some embodiments preferably comprises a quaternary salt, and in particular an organo titanate salt. In preferred embodiments, such organo titanate salt has the formula:

(OC$_2$H$_4$0)Ti[OP(0)(ONH(C$_2$H$_5$)$_3$))OP(0)(OC$_8$H$_7$)$_2$]$_2$.

Also, in the embodiment we have the additional surfactants: Alcolec S, Alkaterge E, Alkaterge T, Busperse 47, Busperse 203, Disperbyk 130, Bykunen, Disperse-Ayd #6, Disperse-Ayd #7, Disperse-Ayd #8, Disperse-ayde W-22 and Disperse-Ayd W-28, Nopcosperse 44, Nopcosant K, Lomar Series, Solsperse Hyperdispersants, Solsperse Hyperdispersants 22, Hyperdispersants 21, Solsperse RW40 Resin, Solsperse RX50 Resin, Solsperse 24000, Solsperse Hyperdispersants 26, Baysilone Fluid OL17, RAYBO 56-MagnaMix, RAYBO 61, TAMOL 850, Triton N-101, Triton N-998, Triton X-405, Triton N-101, Tamol 850, Nuosperse 657, Nuosperse 700, Silwet L-7001, Silwet L-7605, and Dimethylaminqethanol DMAE.

In other embodiments, the surfactant used may be selected from a wide variety of surfactants known to those of ordinary skill in the art, with the functional requirement being that such surfactant provide sufficient wettability to the carbon black pigment to assure substantially complete dispersion thereof during grinding, to provide the necessary level of conductivity to the cured primer, and to diminish flocculation in the stored primer composition.

In addition to the coating compositions of the present invention which may be cured by baking in ovens known to those of ordinary skill in the art, additional compositions may be directed to an air dry coating, a lacquer formulation, a flexible formulation, and compositions wherein the above formulations further include the incorporation of a conductive metal in the grind to improve conductivity.

Figure 2:
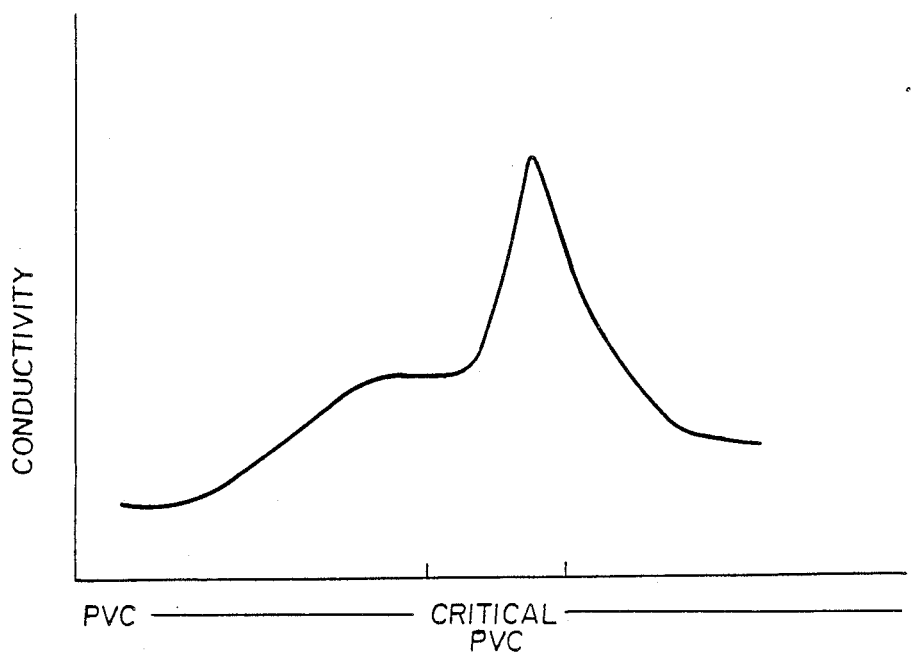
FIG. 2 is a graphical representation depicting conductivity versus pigment volume concentration (PRC), and showing a narrow area of the critical PVC where conductivity is improved approximately 100% over lower pigment volume concentration values.

As set forth in the following Examples and as referred to in FIG. 3 of the drawing, by utilizing a conductive metal (such as copper, nickel or silver) in the grind, the conductivity of the coating composition is shown to improve approximately 100% over coating compositions which contain only the conductive carbon component, as shown in FIG. 2, for example.

Figure 3:
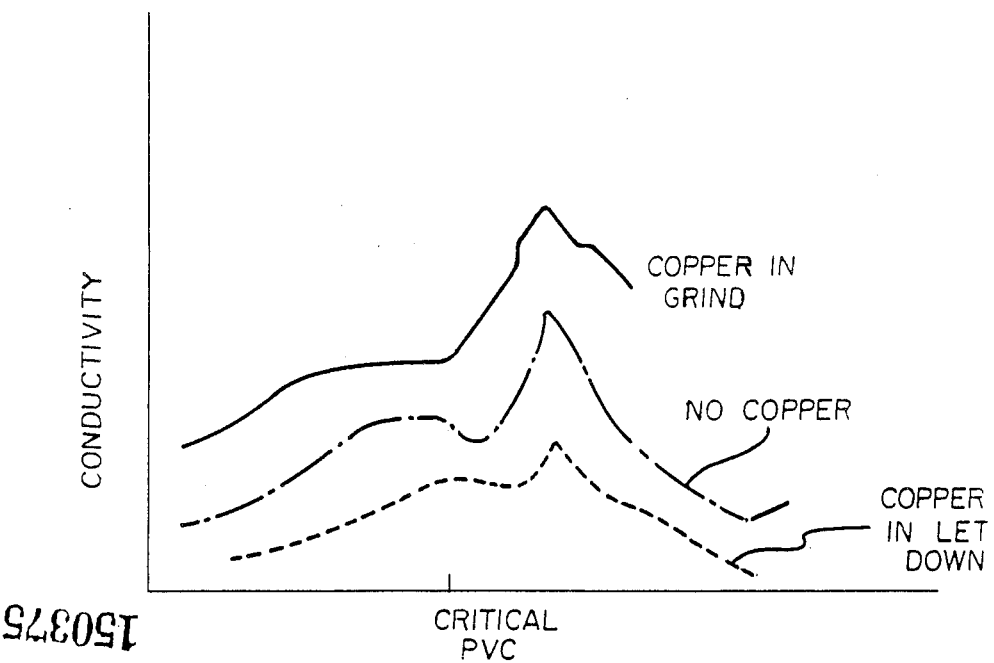
FIG. 3 is a graphical representation of conductivity versus PVC and depiciting the level of critical PVC for copper pigment in the grind, the formulations of the present invention without any metallic pigment, and the same copper pigment contained within the let down.

Specifically, FIG. 3 depicts an increase in conductivity where the metallic element, whether copper, nickel, silver or other metallic pigment is placed to the grind, with the metallic pigment placed in the let down showing an overall decrease in conductivity of the coating system.

Figure 4:
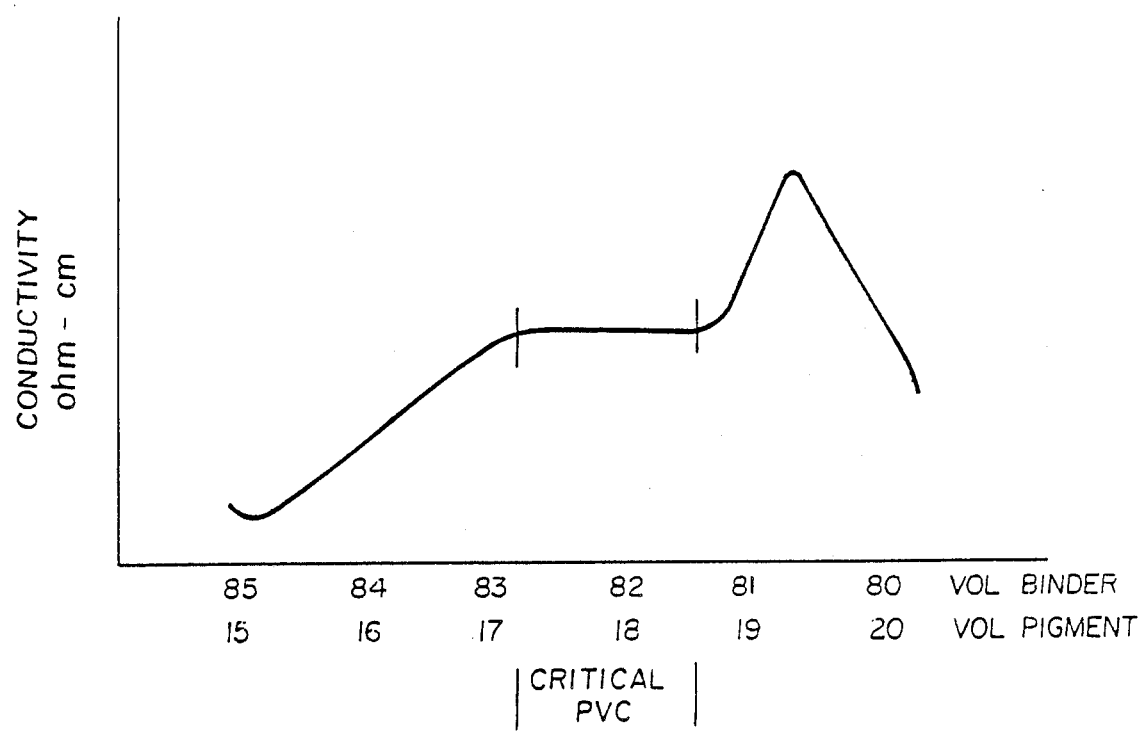
FIG. 4 is a graphical representation of conductivity versus pigment volume concentration, and showing a peak in conductivity above the level of critical PVC for one representative formulation and showing the levels of volume of binder and volume of pigment, as those levels affect conductivity.
Figure 5:
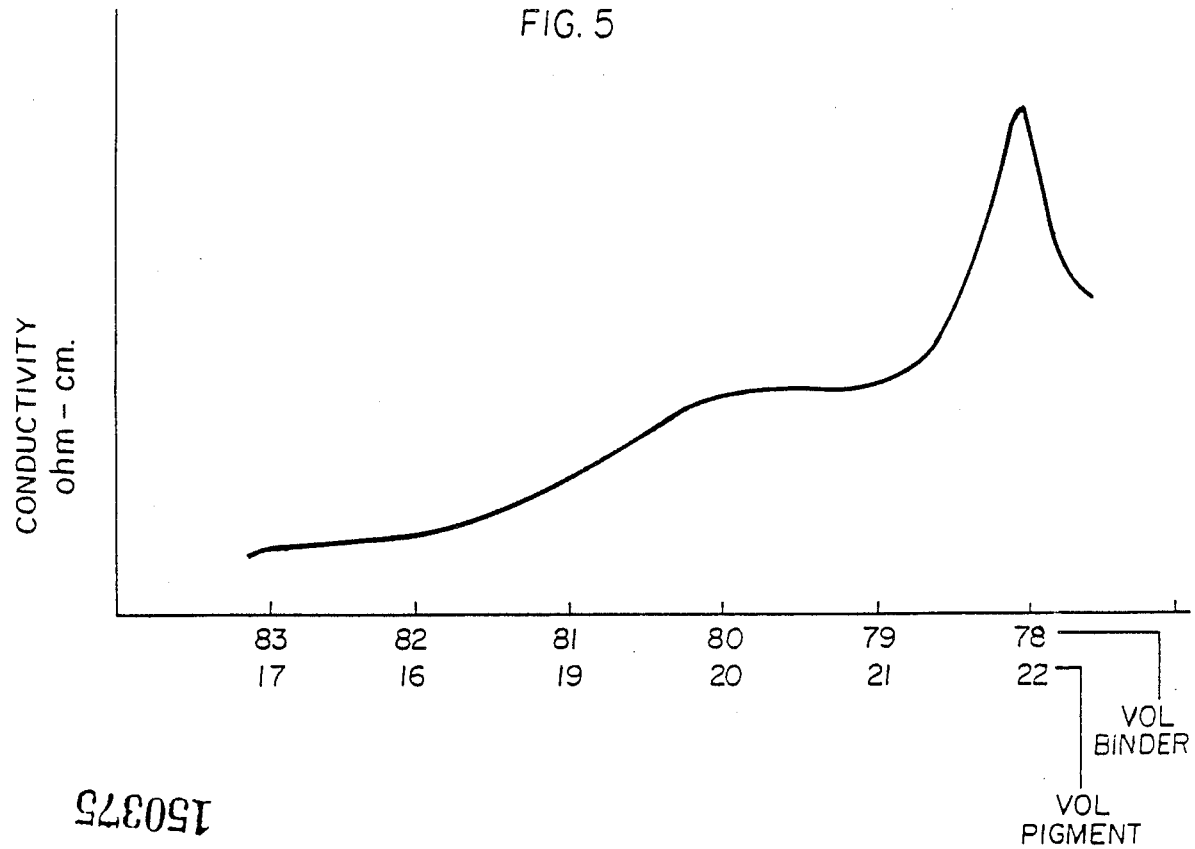
FIG. 5 is a graphical representation similar to the graphical representation of FIG. 4 and showing the relationship between conductivity and pigment volume concentration for another formulation.

FIGS. 4 and 5 depict conductivity versus PVC as graphically illustrated for different binder and pigment systems. A minimum amount of high shear dispersion must be achieved when metallic pigments are utilized before there is any increase in conductivity; otherwise, a decrease in conductivity results. The amount of high shear dispersion is different for each binder/pigment system, and is different for different types of mills, such as a sand mill or a steel ball mill. However, techniques of determining the critical pigment volume concentration are well within the skill of those having ordinary skill in the art, and can be accomplished graphically, as shown in the Figs. hereof without undue experimentation.

As set forth in the following Examples, the coating compositions may include approximately 18% to 30% of a conductive finely ground metallic compound It has been found that metallic compound mut be added into the grind and ground into a fine particle size, otherwise the result is not an increase in conductivity, but rather a decrease in conductivity, as when such metallic pigment is placed in the let down.

The pigment volume concentration (PVC) as shown in FIGS. 2-5 is also found to have a significant effect in regard to peaks of conductivity. In particular, it has been discovered that there is a narrow area above the critical pigment volume concentration where conductivity is improved approximately 100% over the level of conductivity at lower pigment volume concentrations.

In addition to utilization of the primer coating compositions of the present invention in conjunction with an electrocoating bath, such coating compositions are also useful in connection with known methods of electrostatic spraying. In particular, automotive manufacturers and other manufacturers of heavy equipment waste a great deal of top coat in electrostatic spraying. It has been determined that a conductive substrate will give increased "wrap" —i.e., 90% of the electrostatically charged coating will be deposited upon the substrate to be coated, rather than 80% as with prior art non-conductive undercoat compositions.

Other applications for use of the conductive coating primer compositions of the present invention include utilization with low-bake acrylic top coat compositions. Although such low-bake acrylic top coat compositions have been found to have poor corrosion resistance, such compositions would function more optimally in conjunction with the present conductive primer compositions.

Other small items, such as toilet seats for example, have in the past been electrostatically sprayed. However, if such items were rendered more conductive, such as by utilization of the conductive coating compositions of the present invention, less top coat spray would be wasted in "overspray".

Another area of application for the conductive coating primer compositions of the present invention is in the area of electromagnetic shielding. In particular, in automobiles and other vehicles, for example, static discharge from the ignition system interferes with the on-board computer systems. However, a conductive spray disposed onto the polymeric housing for such computer systems would be sufficiently conductive to prevent such static discharge from the ignition system from causing such interference. Moreover, disposing such sprayed-on electromagnetic shielding on such polymeric surface would save the added weight, and the time and expense of adding a metallic housing thereto. Of course, when a metallic housing is used, a polymeric or other non-conductive housing must be used inside to prevent shorting out.

Additional advantages of the conductive coating compositions of the present invention over prior art compositions and techniques include the property of enhanced maintenance of conductivity over time, in both the wet form, and in the dry film ready for top coating. In particular, prior art composition films have oxidized rather quickly, to lose thereby their conductive coating features. The following coating compositions have been tested for more than a two month period in the in-can (wet) format and the coating compositions have remained conductive. Moreover, coated parts (dry) have been tested after coating with the conductive coating compositions with the present invention more than 30 days prior thereto, and there has been no substantial loss of conductivity.

Preferred embodiments of the primer compositions of the present invention are further set forth in the following Examples:

EXAMPLE I

| DESCRIPTION | POUNDS | GALLONS | WGT. SOL. | VOL. SOL. | SOLIDS WEIGHT PERCENT |
|---|---|---|---|---|---|
| (A) 5782 RESIN (high solids polyester resin) | 88.92 | 10.2800 | 84.47 | 9.6118 | 55.2% |
| (B) CYMEL 303 RESIN (cross-linking agent hexamethoxymethylmelamine) | 36.30 | 3.6300 | 36.30 | 3.6300 | 23.7% |
| (C) CONDUCTEX 40-220 (carbon pigment) | 29.00 | 1.5263 | 29.00 | 1.5263 | 19.0% |
| (D) SC-100 SOLVENT (aromatic petroleum solvent) | 78.88 | 10.8800 | .00 | .0000 | — |
| (E) 1,1,1, TRICHLOROETHANE-SM (halogenated hydrocarbon) | 273.75 | 25.0000 | .00 | .0000 | — |
| (F) KEN-REACT KR 238T (quaternary salt) | .56 | .0700 | .56 | .0700 | .36% |
| (G) 1,1,1, TRICHLOROETHANE-SM (halogenated hydrocarbon) | 525.93 | 48.0300 | .00 | .0000 | — |
| (H) NACURE 155 (catalyst aromatic sulfonic acid) | 4.81 | .5900 | 2.65 | .2891 | 1.7% |
| TOTALS | 1038.15 | 100.00 | 152.98 | 15.1272 | 99.96 |

PVC: 10.09%
SOLIDS BY WGT: 14.74%
SOLIDS BY VOL: 15.13%
VOC (LB/GL): 3.17
SQ FT COVERAGE (1 MIL): 243

Items A–F of the above composition were charged to a steel ball mill, and ground for approximately 10 hours, which gave a grind of approximately 6.5 to 7.5 on the Hegman grind scale.

Items G and H were added to the above dispersion, to provide a viscosity to the primer of 7 to 8 seconds utilizing a No. 3 Zahn cup.

The above conductive primer coating was contained within a volume, and a section of non-conductive, polymeric material was dipped there into. The material was cured at 300° F. for 15 minutes, and then tested for electrical resistance. The cured coating was found to be 0.2 to 0.5 mils in thickness. Upon testing, the film displayed high levels of durability and field exposure in the following areas, such as, adhesion, impact, hardness, freeze-thaw cycling, and all properties demanded by the automotive industry.

EXAMPLE II

The preferred components utilized in the primer compositions of the present invention are identified as being available from at least the following producers:

| COMPONENT | NAME OF THE COMPANY | ADDRESS |
|---|---|---|
| Conductex 40-220 | Columbian Chemicals Co. | P.O. Box 37 Tulsa, OK. 74102 |
| NACURE 155 | King Industries, Inc. | Science Road Norwalk, CT. 06852 |
| Aromatic 100 | Exxon Company | P.O. Box 2180 Houston, TX 77001 |
| Methyl Chloroform | Diamond Shamrock Corp. | Ind. Chemical Technical Ctr. P.O. Box 191 Painesville, OH 44077 |
| Quatenary Salt | Kenrich Petrochemicals | 140 E. 22nd Bayonne, NJ. 07002 |
| CYMEL 303 Resin | American Cyanamid Co. | Wayne, NJ 07470 |
| High Solids Polyester 5782 | Cargill Technical | P.O. Box 9300 Minn., Mn. 55440 |

EXAMPLE III

The 5782 Cargill polyester resin was replaced with an epoxy resin, and similar results of electroconductivity and film integrity were noted.

EXAMPLE IV

The 5782 Cargill polyester resin was replaced with an epoxy-ester resin, and similar results of electroconductivity and film integrity were noted.

EXAMPLE V

The 5782 Cargill polyester resin was replaced with an epoxy urea resin, and similar results of electroconductivity and film integrity were noted.

EXAMPLE VI

The above composition of Example I was applied in two coats at 0.1 mils each. The conductivity was found to be twice that of a 0.2 mil film.

EXAMPLE VII

Compositions similar to that of Example I were made by utilizing Conductex 975, Conductex SC, and Conductex 900 as the carbon pigment. Similar results were obtained.

EXAMPLE VIII (Metallic Baking Formula)

The following formulation was produced according to techniques well-known to those of ordinary skill in the art. Upon testing the specific resistivity was found to be 0.7 ohm-cm.

| DESCRIPTION | POUNDS | GALLONS | WGT. SOL. | VOL. SOL. | SOLIDS WEIGHT PERCENT |
|---|---|---|---|---|---|
| 10-613 RESIN (phenolic-modified alkyd resin) | 20.46 | 2.6400 | 12.28 | 1.3200 | 6.4% |
| 5782 RESIN (high solids polyster resin) | 42.21 | 4.8800 | 40.10 | 4.5628 | 21.0% |
| K-FLEX 188-50 (flexible polyester resin) | 17.67 | 1.9100 | 17.67 | 1.9100 | 9.2% |
| CYMEL 1168 (cross-linking agent melamine) | 25.33 | 2.7900 | 25.33 | 2.7900 | 13.3% |
| NUOSPERSE 700 (sufactant) | 6.88 | .8000 | 3.44 | .3200 | 1.8% |
| KEN-REACT KR 238T (quaternary salt) | .56 | .0700 | .56 | .0700 | 0.36% |
| 16% ZINC DRIER (film drier) | 4.34 | .5100 | 3.12 | .3570 | 1.60% |
| CONDUCTEX 40-220 (carbon pigment) | 31.90 | 2.1277 | 31.90 | 2.1277 | 16.70% |
| ISOBUTYL ALCOHOL (solvent) | 80.16 | 12.0000 | .00 | .0000 | .00% |
| VMP 66 (solvent) | 74.40 | 12.0000 | .00 | .0000 | .00% |
| ETHYL 3-ETHOXYPROPIONATE (hydrocarbon solvent) | 94.32 | 12.0000 | .00 | .0000 | .00% |
| COPPER FLAKE EMX-2 (metallic pigment) | 50.00 | .7000 | 50.00 | .7000 | 26.20% |
| ETHYL 3-ETHOXYPROPIONATE (solvent) | 51.09 | 6.5000 | .90 | .0000 | .00% |
| VMP 66 (solvent) | 40.86 | 6.5900 | .00 | .0000 | .00% |
| ISOBUTYL ALCOHOL (solvent) | 46.76 | 7.0000 | .00 | .0000 | .00% |
| DIACETONE ALCOHOL (solvent) | 19.55 | 2.5000 | .00 | .0000 | .00% |
| ETHYL 3-ETHOXYPROPIONATE (solvent) | 62.88 | 8.0000 | .00 | .0000 | .00% |
| VMP 66 (solvent) | 46.50 | 7.5000 | .00 | .0000 | .00% |
| ISOBUTYL ALCOHOL (solvent) | 53.44 | 8.0000 | .00 | .0000 | .00% |
| NACURE 155 (catalyst aromatic sulfonic acid | 12.24 | 1.5000 | 6.73 | .7350 | 3.50% |
| TOTAL: | 781.55 | 100.00 | 191.13 | 14.8925 | 100.00% |
| PVC: | 18.99% | | | | |
| SOLIDS BY WGT: | 24.46% | | | | |
| SOLIDS BY VOL: | 14.89% | | | | |
| VOC (LB/GL): | 5.90 | | | | |
| SQ. FT COVERAGE (1 MIL): | 239 | | | | |
| PIGMENT SOLIDS: | | | | 81.90 | 2.8277 |
| VEHICLE SOLIDS: | | | | 95.38 | 10.5828 |

EXAMPLE IX

Formulations having the following variations in proportions of ingredients from those illustrated in Example VIII are prepared and found to be effectuate satisfactory coating properties:

| DESCRIPTION | PARTS BY WEIGHT | |
|---|---|---|
| MIXTURE OF POLYESTER RESIN | 8 | 11.0% |
| MELAMINE RESIN | 3 | 4.0% |
| NUOSPERSE 700 | 0.4 | 0.5% |
| CATALYST (ZINC + ACID) | 1 | 1.5% |
| KEN-REACT - 238T | .00 | .08% |
| CONDUCTEX 40 - 220 | 3.5 | 4.5% |
| COPPER FLAKE EMX 2 | 5.75 | 7.5% |
| MIXTURE OF SOLVENTS | 78.29 | 71.42% |
| | 100.00 | 100.00% |

EXAMPLE X (Air Dry Formula)

The following formulation was produced according to techniques well-known to those of ordinary skill in the art. Upon testing the specific resistivity was found to be 0.4 ohm-cm.

EXAMPLE XI

Formulations having the following variations in proportions of ingredients from those illustrated in Example X are prepared and found to be effectuate satisfactory coating properties:

| DESCRIPTION | PARTS BY WEIGHT | |
|---|---|---|
| B-67 (SOLIDS) | 10.0 | 12.0% |
| CONDUCTEX 40-220 | 4.0 | 5.0% |
| SILICON & NUOSPERSE 700 | 0.8 | 0.9% |
| COPPER FLAKE EMX 2 | 6.0 | 7.0% |
| MIXTURE OF SOLVENTS | 79.2 | 75.1% |
| | 100.0 | 100.0% |

EXAMPLE XII (Non-Metallic, Flexible Baking Formula)

The following formulation was produced according to techniques well-known to those of ordinary skill in

| DESCRIPTION | POUNDS | GALLONS | WGT. SOL. | VOL. SOL. | SOLIDS WEIGHT PERCENT |
|---|---|---|---|---|---|
| VMP 66 (solvent) | 111.60 | 18.0000 | .00 | .0000 | .0% |
| ETHYL 3-ETHOXYPROPIONATE (solvent) | 47.16 | 6.0000 | .00 | .0000 | .0% |
| B-67 45% VMP00 (acrylic air dry resin) | 189.80 | 26.0000 | 85.41 | 9.4120 | 48.9% |
| NUOSPERSE 700 (surfactant) | 6.88 | .8000 | 3.44 | .3200 | 2.0% |
| CONDUCTEX 40-220 (carbon pigments) | 32.00 | 2.1343 | 32.00 | 2.1343 | 18.3% |
| COPPER FLAKE EMX-2 (metallic pigment) | 50.00 | .7000 | 50.00 | .7000 | 28.7% |
| KEN-REACT KR 238TG (quarternary salt) | .56 | .0700 | .56 | .0700 | 0.3% |
| 20% SOLN KD-618 (silicon wax wetting agent) | 15.46 | 2.0000 | 3.09 | .3480 | 1.8% |
| VMP 66 (solvent) | 212.66 | 34.3000 | .00 | .0000 | 0.0% |
| ETHYL 3-ETHOXYPROPIONATE (solvent) | 78.60 | 10.0000 | .00 | .0000 | 0.0% |
| TOTAL | 744.72 | 100.0000 | 174.50 | 12.9843 | 100.0% |
| PVC: | 22.30% | | | | |
| SOLIDS BY WGT: | 23.43% | | | | |
| SOLIDS BY VOL: | 12.98% | | | | |
| VOC (LB/GL): | 5.70% | | | | |
| SQ. FT. COVERAGE (1 MIL): | 208 | | | | |
| PIGMENT SOLIDS: | | | 82.62 | 2.8949 | |
| VEHICLE SOLIDS: | | | 85.41 | 9.4120 | | the art. Upon testing the specific resistivity was found to be 9.0 ohm-cm.

| DESCRIPTION | POUNDS | GALLONS | WGT. SOL. | VOL. SOL. | SOLIDS WEIGHT PERCENT |
|---|---|---|---|---|---|
| DESMORPHEN 670-80 (polyester resin) | 82.80 | 9.0000 | 66.24 | 6.7500 | 48.3% |
| SC-100 SOLVENT (solvent) | 145.00 | 20.0000 | .00 | .0000 | .00 |
| NUOSPERSE 700 (surfactant) | 6.00 | .6977 | 3.00 | .2791 | 2.2% |
| KEN-REACT KR 238T (quaternary salt) | .56 | .0700 | .56 | .0700 | 0.4% |
| CONDUCTEX 40-220 (carbon pigment) | 31.90 | 2.1277 | 31.90 | 2.1277 | 23.3% |
| ETHYL 3-ETHOXYPROPIONATE (solvent) | 78.60 | 10.0000 | .00 | .0000 | .0% |
| URAC II CATALYST SOLN (tubutyl-tin-dilaureate) | 4.00 | .4938 | .04 | .0045 | trace |
| 16% ZINC DRIER (film drier) | 4.00 | .4706 | 2.88 | .3394 | 2.1% |
| ETHYL 3-ETHOXYPROPIONATE (solvent) | 78.60 | 10.0000 | .00 | .0000 | .00% |
| N-BUTYL ACETATE (U.G.) (solvent) | 147.00 | 20.0000 | .00 | .0000 | .00% |
| XYLOL (solvent) | 51.69 | 7.1500 | .00 | .0000 | 0.0% |
| CORONATE EH RESIN (cross-linking agent hexamethylenediisocyanate trimer) | 32.46 | 3.3600 | 32.46 | 3.3600 | 23.7% |
| N-BUTYL ACETATE (U.G.) (solvent) | 122.30 | 16.6400 | .00 | .0000 | .0% |
| TOTAL: | 784.91 | 100.00 | 137.10 | 12.9209 | 100.0% |

| DESCRIPTION | POUNDS | GALLONS | WGT. SOL. | VOL. SOL. | SOLIDS WEIGHT PERCENT |
|---|---|---|---|---|---|
| PVC: | 16.47% | | | | |
| SOLIDS BY WGT: | 17.47% | | | | |
| SOLIDS BY VOL: | 12.92% | | | | |
| VOC (LB/GL): | 6.48% | | | | |
| SQ. FT. COVERAGE (1 MIL): | 207 | | | | |
| PIGMENT SOLIDS: | | | 32.90 | 2.1277 | |
| VEHICLE SOLIDS: | | | 98.70 | 10.1100 | |

EXAMPLE XIII

Formulations having the following variations in proportions of ingredients from those illustrated in Example XII are prepared and found to be effectuate satisfactory coating properties:

| DESCRIPTION | PARTS BY WEIGHT | |
|---|---|---|
| POLYESTER RESIN (SOLIDS) | 8.0 | 9.0% |
| ISOCYANATE RESIN | 4.0 | 4.5% |
| NUOSPERSE 700 | 0.3 | 0.5% |
| ZINC PLUS DBT CATALYST | 0.3 | 0.5% |
| KR-238T | .6 | 0.08% |
| CONDUCTEX 40-220 | 3.8 | 4.2% |
| MIXTURE OF SOLVENTS | 83.4 | 81.22% |
| | 100.0 | 100.00% |

EXAMPLE XIV (Metallic Baking Formula)

The following formulation was produced according to techniques well-known to those of ordinary skill in the art. Upon testing the specific resistivity was found to be 0.9 ohm-cm.

EXAMPLE XV

Formulations having the following variations in proportions of ingredients from those illustrated in Example XIV are prepared and found to be effectuate satisfactory coating properties:

| DESCRIPTION | PARTS BY WEIGHT | |
|---|---|---|
| PHENOLIC ALKYD (SOLIDS) | 14.00 | 15.0% |
| SILICON WAX WETTING AGENT PLUS SOLSPERSE 5000 WETTING AGENT | .98 | 1.2% |
| KR-238T | .06 | 0.08% |
| PARAPLEX - 662 | 0.04 | 0.06% |
| SUSPENO 220 (SOLIDS) | 0.1 | 0.2% |
| MIXED DRIERS | 0.6 | 0.7% |
| ANTI-SKINNING AGENT | 0.1 | 0.15% |
| STABILIZER (TRIETHYLAMINE) | 0.2 | 0.3% |
| CONDUCTEX 40-220 | 6.8 | 7.3% |
| COPPER FLAKE EMX -2 | 5.5 | 6.5% |
| MIXTURE OF SOLVENTS | 71.26 | 67.97% |
| | 100.00 | 100.00% |

| DESCRIPTION | POUNDS | GALLONS | WGT. SOL. | VOL. SOL. | SOLIDS WEIGHT PERCENT |
|---|---|---|---|---|---|
| ETHYL 3-ETHOXYPROPIONATE (solvent) | 86.46 | 11.0000 | .00 | .0000 | .0% |
| VMP 66 (solvent) | 136.40 | 22.0000 | .00 | .0000 | .0% |
| SOLSPERSE 5000 (wetting agent) | 5.00 | .4000 | 5.00 | .4000 | 2.1% |
| KEN-REACT KR 238T (quaternary salt) | .56 | .0700 | .56 | .0700 | 0.2% |
| 20% SOLN KD-618 (silicon wax wetting agent) | 15.46 | 2.0000 | 3.09 | .3480 | 1.3% |
| CONDUCTEX 40-220 (carbon pigment) | | | | | |
| COPPER FLAKE EMX-2 (metallic pigment) | 45.75 | .6405 | 45.75 | .6405 | 19.6% |
| 10-613 RESIN (phenolic-modified alkyd resin) | 189.88 | 24.5000 | 113.93 | 12.2500 | 48.8% |
| PARAPLEX G-62 (soyabean oil epoxide) | 3.77 | .4575 | 3.77 | .4575 | 1.6% |
| SUSPENO #220 (xylene wetting agent) | 5.11 | .6862 | 1.24 | .1510 | 0.5% |
| ETHYL 3-ETHOXYPROPIONATE (solvent) | 86.46 | 11.0000 | .00 | .0000 | .00 |
| VMP 66 (solvent) | 138.45 | 22.3300 | .00 | .0000 | .00 |
| 12% COBALT (12% cobalt drier) | .31 | .0366 | .24 | .0275 | 0.1% |
| 9% MANGANESE CEM-ALL (9% Manganese drier) | 2.48 | .3111 | 1.79 | .1960 | 0.8% |
| 16% UTD DRIER | 4.03 | .4601 | 3.02 | .3027 | 1.3% |
| EXKIN #2 (anti-skimming agent methyl ethyl ketoxime) | .99 | .1294 | .00 | .0000 | .00 |
| TRIETHYLAMINE | 2.00 | .3295 | .00 | .0000 | .00 |
| TOTAL | 778.01 | 100.00 | 233.29 | 18.5049 | 99.8% |
| PVC: | 23.58% | | | | |
| SOLIDS BY WGT: | 29.99% | | | | |
| SOLIDS BY VOL: | 18.50% | | | | |
| VOC (LB/GL): | 5.45% | | | | |
| SQ. FT. COVERAGE (1 MIL): | 297 | | | | |
| PIGMENT SOLIDS: | | | 101.27 | 4.3628 | |
| VEHICLE SOLIDS: | | | 113.93 | 12.2500 | |

EXAMPLE XVI (Water Reducible Formulation)

The following formulation was produced according to techniques well-known to those of ordinary skill in the art:

| DESCRIPTION | POUNDS | GALLONS | WGT. SOL. | VOL. SOL. | SOLIDS WEIGHT PERCENT |
|---|---|---|---|---|---|
| KELSOL 3950-B2G-70 | 262.88 | 31.0000 | 184.02 | 20.1500 | 54.4% |
| 5% MANGANESE HYDROCURE | 4.95 | .6600 | 2.57 | .2647 | 0.1% |
| TRIETHYLAMINE | 8.19 | 1.3500 | .00 | .0000 | — |
| KEN-REACT KR 238T | 10.56 | 1.3200 | 10.56 | 1.3200 | 3.1% |
| DEIONIZED WATER | 438.57 | 52.6500 | .00 | .0000 | — |
| CYMEL 327 RESIN | 87.71 | 8.9500 | 78.94 | 7.6970 | 23.3% |
| PRINTEX XE 2 | 55.80 | 3.7218 | 55.80 | 3.7218 | 16.5% |
| MICRO #870 GRAPHITE | 6.58 | .3511 | 6.58 | .3511 | 1.9% |
| TOTAL | 875.24 | 100.00 | 338.47 | 36.5046 | 99.3% |
| PVC: | 12.49% | | | | |
| SOLIDS BY WGT: | 38.67% | | | | |
| SOLIDS BY VOL: | 33.50% | | | | |
| VOC (LB/GL): | 2.07% | | | | |
| SQ. FT. COVERAGE (1 MIL): | 537 | | | | |
| PIGMENT SOLIDS: | | | 63.46 | 4.1841 | |
| VEHICLE SOLIDS: | | | 263.22 | 27.8735 | |

EXAMPLE XVII

Formulations having the following variations in proportions of ingredients from those illustrated in Example XVI are prepared and found to be effectuate satisfactory coating properties:

| DESCRIPTION | PARTS BY WEIGHT | |
|---|---|---|
| KELSOL 3950-B2G-70 | 45.00 | 65.0% |
| 5% MANGANESE HYDROCURE | 0.07 | 0.13% |
| TRIETHYLAMINE | — | — |
| KEN-REACT KR 238T | 2.5 | 3.7% |
| DEIONIZED WATER | — | — |
| CYMEL 327 RESIN | 18.0 | 28.0% |
| PRINTEX XE 2 | 13.0 | 20.0% |
| MICRO #870 GRAPHITE | 1.5 | 2.3% |

EXAMPLE XVIII (Water Reducible Formulation With Alternative Surfactant)

The following formulation was produced according to techniques well-known to those of ordinary skill in the art:

| DESCRIPTION | POUNDS | GALLONS | WGT. SOL. | VOL. SOL. | SOLIDS WEIGHT PERCENT |
|---|---|---|---|---|---|
| KELSOL 3950-B2G-70 | 246.19 | 29.0313 | 172.33 | 18.8703 | 56.04% |
| 5% MANGANESE HYDROCURE | 4.92 | .6566 | 2.56 | .2633 | 0.84% |
| DIMETHYLAMINOETHANOL DMAE | 7.39 | .9995 | .00 | .0000 | — |
| DEIONIZED WATER | 369.28 | 44.3309 | .00 | .0000 | — |
| 50% SOLN OF ND-600 | 9.85 | 1.3218 | 4.93 | .6212 | 1.61% |
| CYMEL 327 RESIN | 81.98 | 8.3653 | 73.78 | 7.1942 | 24.13% |
| PRINTEX XE 2 | 52.19 | 3.4808 | 52.19 | 3.4808 | 17.07% |
| DIONIZED WATER | 98.47 | 11.8215 | .00 | .0300 | — |
| TOTAL | 870.27 | 100.00 | 305.79 | 30.4298 | 100.05 |
| PVC: | | | 12.83% | | |
| SOLIDS BY WGT: | | | 35.14% | | |
| SOLIDS BY VOL: | | | 30.43% | | |
| VOC (LB/GL): | | | 2.20% | | |
| SQ. FT. COVERAGE (1 MIL): | | | 488 | | |
| PIGMENT SOLIDS: | | | | 55.74 | 3.9039 |
| VEHICLE SOLIDS: | | | | 246.37 | 26.0908 |

EXAMPLE XIX

Formulations having the following variations in proportions of ingredients from those illustrated in Example XVI are prepared and found to be effectuate satisfactory coating properties:

| DESCRIPTION | PARTS BY WEIGHT |
|---|---|
| PIGMENT- CARBON BLACK | 4.0-7.0% |
| BINDER - ALKYD RESIN | 17.0-22.0% |
| MELAMINE RESIN | 6.0-10.0% |
| ADDITIVES - DRIER 5% MANGANESE | 0.1-0.5% |
| DMAE | 0.1-2.0% |
| SOLVENT WATER | 40.0-65.0% |
| BUTYL CELLOSOLVE (in resin) | 5.0-10.0% |
| BUTANOL (in Melamine) | .2-2.0% |

EXAMPLE XX

The formulation of Example XVIII, supra, is produced according to the techniques as set forth in EX- AMPLE 1 and according to techniques known to those of ordinary skill in the art, and wherein the surfactant thereof is successively replaced by one or more of Alcolec S, Alkaterge E, Alkaterge T, Busperse 47, Busperse 203, Disperbyk 130, Bykunen, Disperse-Ayd #6, Disperse-Ayd #7, Disperse-Ayd #8, Disperse-ayde W-22 and Disperse-Ayd W-28, Nopcosperse 44, Nopcosant K, Lomar Series, Solsperse Hyperdispersants, Solsperse Hyperdispersants 22, Hyperdispersants 21, Solsperse RW40 Resin, Solsperse RX50 Resin, Solsperse 24000, Solsperse Hyperdispersants 26, Baysilone Fluid OL17, RAYBO 56-MagnaMix, RAYBO 61, TAMOL 850, Triton N-101, Triton N-998, Triton X-405, Triton N-101, Tamol 850, Nuosperse 657, Nuosperse 700, Silwet L-7001, Silwet L-7605, and Dimethylaminqethanol DMAE (all such alternative surfactant and/or dispersant components and The identification of the course of origin thereof are listed on pages 40–42 hereof).

The resulting primer compositions have carbon black pigment which is substantially completely dispersed, a satisfactory level of conductivity is maintained in the cured film, and the stored pre-cured, liquid-state primer is sufficiently stable to avoid any substantial amount of flocculation.

EXAMPLE XXI (Water Reducible Formulation With No Surfactant or Dispersant)

The following formulation was produced according to techniques well-known to those of ordinary skill in the art:

| GRIND TIME | RESISTANCE |
|---|---|
| 5 | 147 |
| 10 | 137 |
| 15 | *127 |
| 20 | 132 |
| 25 | 142 |
| 30 | 134 |
| 35 | 120 |
| 40 | *110 |
| 45 | 129 |
| 50 | 132 |
| 55 | 124 |
| 60 | **116 |
| 65 | 120 |
| 70 | 125 |
| 75 | 134 |
| 80 | 145 |
| 85 | 145 |
| 90 | 147 |
| 95 | 146 |
| 100 | 145 |
| 105 | 155 |

*CONVENTIAL PRACTICE USE THIS AS OPTIMUM GRIND
**DISCOVERED NEW LOW RESISTANCE GOOD ENOUGH TO ACCEPT ELECTRODEPOSITION

The following additional preferred components utilized in the primer compositions of the present invention are identified as being available from at least the following producers:

| DESCRIPTION | POUNDS | GALLONS | WGT. SOL. | VOL. SOL. | SOLIDS WEIGHT PERCENT |
|---|---|---|---|---|---|
| KELSOL 3950-B2G-70 | 285.57 | 33.6759 | 199.90 | 21.8893 | 57.77 |
| DIMETHYLAMINOETHANOL DMAE | 8.57 | 1.1594 | .00 | .0000 | — |
| DEIONIZED WATER | 428.36 | 51.4233 | .00 | .0000 | — |
| CYMEL 327 RESIN | 95.10 | 9.7037 | 85.59 | 8.3452 | 24.73 |
| PRINTEX XE 2 | 60.54 | 4.0377 | 60.54 | 4.0377 | 17.50 |
| TOTAL | | | 346.03 | | 100.00 |
| PVC: | | | 11.78% | | |
| SOLIDS BY WGT: | | | 39.40% | | |
| SOLIDS BY VOL: | | | 34.27% | | |
| VOC (LB/GL): | | | 2.13% | | |
| SQ. FT. COVERAGE (1 MIL): | | | 550 | | |
| PIGMENT SOLIDS: | | | 60.54 | | 4.0377 |
| VEHICLE SOLIDS: | | | 285.49 | | 30.2345 |

EXAMPLE XXII

The formulation of Example XXI, supra, does not require a surfactant and/or dispersant for adequate wetting, it being understood by those skilled in the art that various polymers and various pigments (such as the particular carbon black herein) may be wetted and dispersed more easily than others. Accordingly, grind times may be varied in various formulations to obtain adequate dispersion. In some formulations, a surfactant and/or dispersant will be necessary in order to utilize grind times which are sufficiently low to render the manufacture of such a formulation economically feasible. The grind time vs resistance chart indicates a newly discovered dip in resistance at a grind time later than the first low resistance following conventional methods:

| COMPONENT | NAME OF THE COMPANY | ADDRESS |
|---|---|---|
| M-P-A 60 (Xylene) | NL Industries, Inc. | P.O. Box 700 Highstown, NJ. 07002 |
| Triethylamine | Union Carbide. | Old Ridgebury Danbury, CT. 55440 |
| EMX 2 Resin | U.S. Bronze Powders | P.O.Box 31 Flemington, NJ. 08822 |
| Desmophen 670 Polyester Resin | Mobay Chemical Corp. | Mobay Road Pittsburg, PA. 15205 |
| Coronate EH | AZS Corporation | 762 Marietta Atlanta, GA. 30318 |
| Nuosperse 700-KD607 | Nuddex, Inc. | Turner Place Piscataway, NJ. 08854 |
| DABCO T-12 KC406, 407 | Air Products | P.O. Box 538 Allentown, PA 18105 |
| Paraplex KP-801 | Rohm and Hass Company | Spring House PA. 19477 |
| Cobalt | Mooney Chemicals, Inc. | 2301 Scranton |

-continued

| COMPONENT | NAME OF THE COMPANY | ADDRESS |
|---|---|---|
| Carboxylate | | Cleveland, OH 44113 |
| Manganese Drier | Mooney Chemicals, Inc. | 2301 Scranton Cleveland, OH 44113 |
| KA100 | Nuddex, Inc. | Turner Place Piscataway, NJ 08854 |
| NUXTRA UTD 16% Catalyst | Nuddex, Inc. | Turner Place Piscataway NJ 08854 |
| Petroleum Distillates | Nuddex, Inc. | Turner Place Piscataway NJ 08854 |
| KEN-REACT 238T | Kenrich Petrochemicals, Inc. | 140 E. 22nd Bayonne, NJ 07002-0032 |
| COPPER FLAKE EMX 2 | United States Bronze Powders, Inc. | P.O. Box 31 Route 202 Flemington, N.J. 08822 |
| MIXTURE OF SOLVENTS | Mooney Chemicals, Inc. | 2301 Scranton Cleveland, OH 44113 |
| 10-613 RESIN | Reichhold Chemicals, Inc. | 525 N. Broadway White Plains, N.Y. 10603 |
| K-FLEX 188-50 | King Industries, Inc. | Science Road Norwalk, CT 06852 |
| 16% ZINC DRIER | Troy Chemical Corp. | One Avenue L Newark, NJ 07105 |
| ISOBUTYL ALCOHOL | Ashland Chemical | P.O. Box 2219 Columbus, Ohio 43216 |
| CYMEL 1168 CYMEL 327 | American Cyanamid Co. | Wayne, NJ 07470 |
| VMP 66 | Ashland Chemical | P.O. Box 2219 Columbus, Ohio 43216 |
| ETHYL 3-ETHOXYPROPIONATE | Eastman Chemical Products, Inc. | Kingsport, Tennessee 37662 |
| DIACETONE ALCOHOL | E-M Company | Box 822 North Chicago, IL. |
| B-67 45% VMPOO | Rohm and Hass Company | Independence Hall West Philadelphia, PA 19105 |
| 20% SOLN KD-618 | W. C. Richards Company | 3555 W. 123rd Blue Island, IL 60406 |
| URAC II CATALYST SOLN | W. C. Richards Company | 3555 W. 123rd Blue Island, IL 60406 |
| SOLSPERSE 5000 | ICI Americas, Inc. | Wilmington, Delaware 19897 |
| SUSPENO #220 | Poly-Resyn, Inc. | 534 Stevens Court, Sleepy Hollow West Dundee, Il 60118 |
| EXKIN #2 | Nuddex, Inc. | Turner Place P.O. Box 365 Piscataway, N.J. 08854 |
| KELSOL 3950 B2G-70 | National Lead | P.O. Box 700 Highstown, NJ 07002 |
| PRINTEX XE 2 | Cary Company | 1555 Wrightwood Ct., Addison, Il. 60101 |
| MICRO #870 GRAPHITE | Asburry Graphite Mills | Asburry St. Warren City, N. J. 08802 |
| BUTYL CELLOSOLVE | Chem Central | 7050 W. 71st., Chgo., Il. 60638 |
| SEC-BUTYL ALCOHOL | Chem Central | 7050 W. 71st., Chgo., Il. 60638 |
| N-BUTYL ALCOHOL | Chem Central | 7050 W. 71st., Chgo., Il. 60638 |
| ALCOLEC S | American Lecithin | P.O. Box 4056 Atlanta, Ga. 30302 |
| | Angus Chemical Company | |
| BUSPERSE 47 | Buckman Laboratories | 1256 North McLean Blvd. Memphis, TN. 38108 |
| BUSPERSE 43 | Buckman Laboratories | 1256 North McLean Blvd. Memphis, TN. 38108 |
| DISPERBYK 130 | U.S. Department of Labor | |
| BYKUNEN | BYK-Chenie USA | 524 S. Cherry Street, Wallingford, CT. 06492 |
| DISPERSE-AYD #6, #7, #8, W22, W28 | Daniel Products Company | 400 Claremont Avenue, Jersey City, N.J. 07304 |
| NOPCOSPERSE 44 | Diamond Shamrock Chemicals Company | Process Chemicals Division, 350 Mt. Kemble Ave. CN 1931, Morristown, NJ 07960-1931 |
| NOPCOSANT K | Diamond Shamrock Chemicals Company | Process Chemicals Division, 350 Mt. Kemble Ave. CN 1931, Morristown, NJ 07960-1931 |
| LOMAR SERIES | Diamond Shamrock Chemicals Company | Process Chemicals Division, 350 Mt. Kemble Ave. CN 1931, Morristown, NJ 07960-1931 |
| DISPERSION + SOLSPERSE | Imperial Chemical Industries, PLC | P.O. Box 42 Hexagon House, Blackley, Manchester M9 3DA |
| SOLSPERSE 2 | Imperial Chemical Industries, PLC. | P.O. Box 42 Hexagon House Blackley, Manchester M9 3DA |
| SOLSPERSE D20, D21, D22, D23, D24, D25, D26 | Imperial Chemical Industries, PLC. | P.O. Box 42 Hexagon House Blackley, Manchester M9 3DA |
| BAYSILONE FLUID OL17 | Mobay Chemical | Inorganic Chemicals Div. Mobay Road Pittsburgh, PA. 15205-9741 |
| RAYBO 56 - MagnaMix | Raybo Chemical Company | Hintington, West Virginia |
| RAYBO 61- AquaWet | Raybo Chemical Company | Huntington, West Virginia |
| TAMOL 850 | Rohm and Haas Company | Corporate Product Integrity |

-continued

| COMPONENT | NAME OF THE COMPANY | ADDRESS |
|---|---|---|
| | | Department Independence Mall West Philadelphia, PA. 19105 |
| TRITON N-101 N-998 X-405 | ROHM and HAAS Company | Independence Mall West Philadelphia, PA 19105 |
| TAMOL 850 | Rohm and Haas Company | Independent Mall West Philadelphia, PA 19105 |
| NUOSPERSE 657 700 | Tenneco Chemicals (Organics & Polymers Division) | Turner Place P. O. Box 365 Piscataway, NJ 08854 |
| SILWET L-7001 L-7605 | Union Carbide Corp. (Speciality Chemicals Division) | 39 Old Ridgebury Road, Danbury, CT. 06817-0001 |

The basic and novel characteristics of the improved apparatus of the present invention will be readily understood from the foregoing disclosure by those skilled in the art. It will become readily apparent that various changes and modifications may be made in the form, construction and arrangement of the improved apparatus of the present invention as set forth hereinabove without departing from the spirit and scope of the invention. Accordingly, the preferred and alternative embodiments of the present invention set forth hereinabove are not intended to limit such spirit and scope in any way.

What is claimed is:

1. An electroconductive coating composition comprising a substantially uniform dispersion of:
   approximately 70%–90% by weight of solids of a curable, film-forming polymeric primary resin binder which, upon cure, will form a stable film to adhere to the surface of a substrate;
   approximately 10%–30% by weight of solids of a conductive carbon pigment;
   a sufficient weight of an electron transmitting surfactant to provide in the cured film conductive pathways for electrons between the conductive pigment particles;
   and sufficient solvents to provide a flowable viscosity to said composition.

2. The electroconductive coating composition of claim 1 wherein said electron transmitting surfactant comprises a quaternary salt.

3. The electroconductive coating composition of claim 2 wherein said quarternary salt has the formula:

$$(OC_2H_40)Ti[OP(0)(ONH(C_2H_5)_3))OP(0-)(OC_8H_7)_2]_2.$$

4. The electroconductive coating composition of claim 1 further comprising an acid catalyst is selected from the group consisting of a mineral acid, aromatic sulfonic acid, p-toluene sulfonic acid, phosphoric acid, alkyl phosphoric acid, maleic acid, trimellitic acid, phthalic acid, and acrylic acid.

5. The electroconductive coating composition of claim 4 wherein said acid catalyst comprises dinonylnaphthalene disulfonic acid.

6. The electroconductive coating composition of claim 4 wherein said acid catalyst comprises dinonylnaphthalene (mono)sulfonic acid.

7. The electroconductive coating of claim 1 wherein said electron transmitting surfactant comprises approximately 0.2–0.45 by weight of solids.

* * * * *